United States Patent Office 2,806,562
Patented Sept. 17, 1957

2,806,562

STRIP-LIKE MEMBER REVERSIBLY CONVERTIBLE FROM A FLEXIBLE TO A RIGID CONDITION

Arthur Edward Harman, Bubbenhall, Coventry, England, assignor to Ludwig Reichmann, Tangier, North Africa Application January 12, 1955, Serial No. 481,422

Claims priority, application Great Britain May 24, 1954

12 Claims. (Cl. 189—34)

The invention relates to a strip-like member of the kind which is reversibly convertible, progressively from one end to the other, from a flat, flexible condition to a prismatic, rigid condition, and which comprises an assembly of generally-rectangular elements arranged in parallel groups, each group extending transversely of the strip-like member and comprising at least three of the elements interconnected at their adjacent edges by hinge pins having their axes directed longitudinally of the strip, and the corresponding elements of adjacent groups being interconnected, by hinge pins having their axes directed transversely of the strip, when the member is in the flat or the prismatic condition but in such a manner that at least the flanking elements of adjacent groups can be freed from each other to permit relative hinging about the coacting longitudinal hinge pins for enabling the said flanking elements to move from the flat, to the prismatic condition and vice versa, the transverse hinge pins enabling the member when in the flat condition to be rolled up, and the outer longitudinal edges of the flanking elements of each group, when these flanking elements are in the positions in which the group is in a prismatic condition, being releasably interengageable to maintain the group in that condition.

Such a member when in the rigid condition can serve a variety of purposes such, for instance, as a mast or crane boom, and when not required for such use can be rolled up for stowing in a small compass. Conveniently, also, the member and its stowage, together with a means for converting it from one condition to the other, are on a wheeled base which provides easy transportation.

It is extremely important that a member of the kind set forth should be truly rigid when in the condition for use, and a main object of the invention is to improve the rigidity.

According to the invention, each of the transverse hinge pins, interconnecting the adjacent transverse edges of two corresponding elements of adjacent groups, has laterally offset portions which, when the hinge pin is appropriately turned with the two elements coplanar, act camwise for urging parts integral or fast with those elements into firm, abutting relationship with the hinge pin jammed to take up any slackness in the hinge.

Preferably the said transverse edges of the corresponding elements in adjacent groups have integral, staggered, hinge barrels, the coaxial portions of the coacting hinge pins engaging in the hinge barrels of one of the elements and the laterally offset portions of the hinge pin engaging in the hinge barrels of the other element.

The parts, fast with the elements, which are urged into abutting relationship for taking up the slackness in the transverse hinge interconnections when the transverse hinge pins are turned in the appropriate direction, are preferably provided by the longitudinal hinge pins of the groups, the ends of these hinge pins abutting each other through ball-type joints which seize when the transverse hinge pins are turned into the jamming position. Conveniently, some of these ball-type joints involve facing cups, at the adjacent ends of two adjacent longitudinal hinge pins, enclosing a free ball, and others of them involve providing alternate longitudinal hinge pins, in a line, with ball-ends and the intermediate ones with cups.

The hinge barrels at the one transverse edges of at least the flanking elements of the groups can be formed with lateral openings enabling them to be engaged over the appropriate portions, extending between the hinge barrels of the adjacent element, of the transverse hinge pins, and this enables them to be disengaged from the corresponding elements of adjacent groups when they are to be moved relatively to them (for example the member is to be converted from the prismatic to the flat condition).

According to a further feature, the laterally-outer edge of one flanking element of each group is provided with an anchor means to be engaged by a hook means at the laterally-outer edge of the opposite flanking element of the group, whereby to form an interlock when the said flanking elements are folded about their longitudinal hinge pins to form the prismatic cross-section. Conveniently, these anchor means are axial portions of longitudinally directed pins which are held fast in barrels of the one flanking elements, the extremities of the pins of adjacent groups having coacting portions of ball-joints so as to abut firmly when the transverse hinge pins are turned into their jamming positions, and the hook means can be lateral openings of hinge barrels of the other flanking elements. These longitudinally directed pins may be tubular and have balls secured in their ends.

A further object of the invention is to enable the transverse hinge pins to be turned automatically into their jamming and non-jamming positions by a means employed for converting the strip-like member reversibly from the flexible to the rigid condition.

According to a further feature, therefore, each of the transverse hinge pins has fast with it a laterally-extending arm, for coaction with the converting means, by which it can be turned into and out of its jamming position.

Preferably, the corresponding one transverse edge of each element is provided with a recess in which at least a major portion of the laterally-extending arm is accommodated when the associated hinge pin is in its maximum non-jamming position.

According to yet another feature, a converting means for the strip-like member includes a former, of the appropriate prismatic cross-section, along which the member can be fed in the longitudinal direction, there being guides for progressively folding the end elements of the groups about their longitudinal hinge pins in the appropriate direction as the member is fed relatively to the former.

For feeding the member, at least corresponding one elements of each group can be provided with apertures to be engaged by extending teeth on a driven chain suitably supported from the converting means.

According to still another feature, the converting means is provided with abutments which coact with surfaces of the laterally-extending arms of the transverse hinge pins whereby to turn the latter into the jamming, or non-jamming, position dependently on whether the member is being fed, relatively to the former, for conversion to the rigid or flexible form.

These abutments can be single ones (that is, a single abutment for coaction with each longitudinal series of corresponding elements in the groups) which are biased for sequentially engaging, and turning, the laterally-extending arms appropriately as the member is being fed relatively to the converting means; or, instead of single abutments, two, arranged in series, can be provided.

In such a case, as regards each said longitudinal series, one of the abutments can be pivoted from the said former and be biased to engage the said surface of each laterally-extending arm, from one side of the other as it passes, for partially turning the hinge pin, and the second abutment can be a stationary one and serve for completing the movement of the transverse hinge pin. For example, when the strip-like member is being moved in the direction for conversion from the flexible to the rigid condition, the pivoted abutment, acting under its bias, enters the recess of each element as it passes and engages a detent formed on the laterally-extending arm of the transverse hinge pin for partially turning the arm in the jamming direction and for positioning a fork opening at the free end of the arm to be engaged subsequently by the stationary abutment, which latter completes the jamming movement of the transverse hinge pin. When the member is being fed in the other direction for conversion from the rigid to the flexible condition, the stationary abutment engages in the forked openings for reversely turning the arms so as partially to unjam the transverse hinge pins, and the pivoted abutment subsequently engages the arms for moving them fully to the unjammed position.

Alternatively, or additionally, spring biased rollers can be supported at the outer side of the elements so as to enter the recesses and turn the laterally-extending arms into the path of a single abutment, of the former, for turning the hinge pins into or out of their jamming positions.

In the accompanying drawings, which illustrate one embodiment of the invention:

Figures 4 and 5 are enlarged views, partly in section, respectively of the lower and upper halves of Figure 3;

Figure 1:
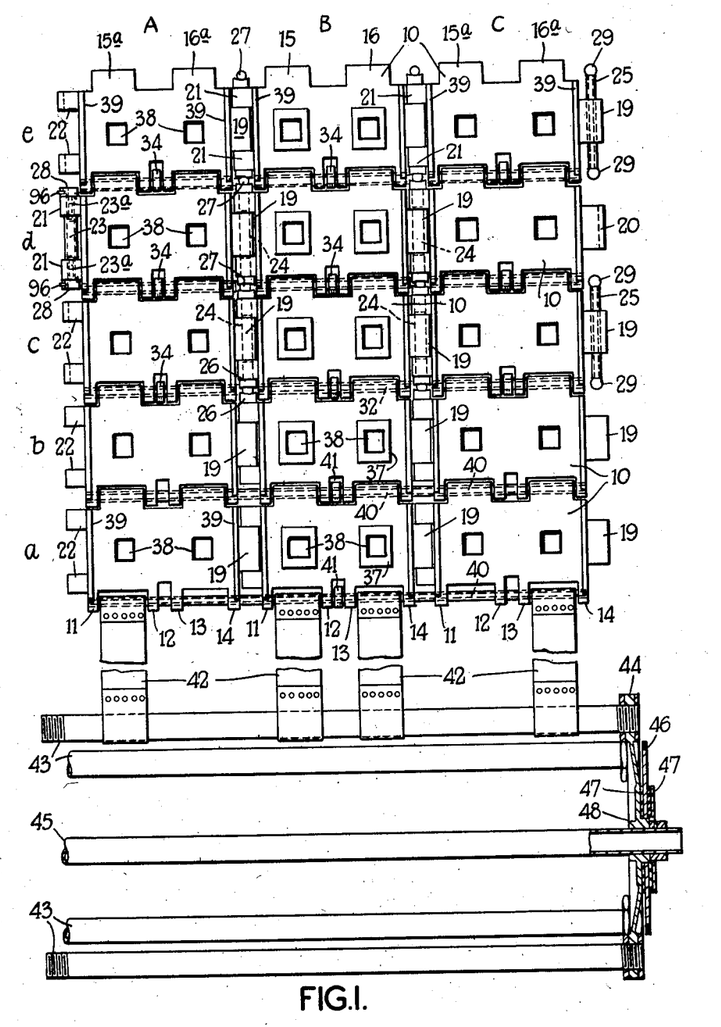
Figure 1 shows in elevation a portion of the strip-like member and of its storage reel.

In Figure 1 is shown a portion, consisting of five groups each of three elements 10, of the strip-like member and, for convenience of description, the groups are lettered *a*, *b*, *c*, etc. from the end where they are attached to the storage reel in a manner hereinafter described, and the elements of each group are designated A, B, C, thus to enable any particular element to be identified by coordinates. The groups *a* and *b* are not intended to be folded to prismatic form but to connect the remainder of the strip-like member to the storage reel.

Each of the elements of all groups has the surface, which will be outermost in the prismatic condition, formed flat, and each has four spaced hinge barrels 11, 12, 13 and 14 on one transverse edge and a pair of hinge barrels 15 and 16 on the other transverse edge. The barrels 15 and 16 of one element respectively fit between the barrels 11, 12, and 13, 14 of the corresponding element in the adjacent group, and the corresponding elements of adjacent groups are interconnected by transverse hinge pins later described. The pairs of hinge barrels 15*a*, 16*a*, of the flanking elements A and C of the groups have lateral openings 18 (see Figure 2) for enabling them to be disengaged from the hinge pins as later described.

At one longitudinal side each of the elements has a single central hinge barrel 19 or 20 to engage between a pair of hinge barrels 22, 22 or 21, 21 at the longitudinal edge of the adjacent element of the group (that is, adjacent in the sense of being next to each other in the planar or the prismatic condition of the groups of the strip-like member), these sets of barrels being interconnected by longitudinal pins 23, 24 or 25.

The hinge barrels 19 and 21 have through-holes in which the coacting pins are made fast, and all of the hinge barrels 20 and 22 are at the side margins of the strip-like member and have lateral openings for engaging over a pin at the opposite margin of the group (that is, with the exception of the elements in groups *a* and *b*, which do not fold to prismatic form).

Thus, the elements in column A are hinged to those in column B by the hinge pins 24 extending through uninterrupted bores of the barrels 19 and 21, and these hinge pins have terminal cups 26 for captive balls 27. The elements in column B are similarly connected to those in column C. For effecting a connection between the outer longitudinal edges of the elements in columns A and C (that is, for holding the groups of elements in prismatic form), the said edges of the elements in column C of the alternate groups *e* and *c* have pins 25 fast in the barrels 19 (for example, by a set-screw, not shown) for the extending ends of the pins to be engaged over by the lateral openings of the barrels 22 at said edges of the elements in column A, and the pairs of barrels 21 in column A of the intermediate group *d* have tubular pins 23 similarly made fast in them and for engagement over by the lateral openings of the hinge barrels 20 at the said edge of the element in column C.

Each tubular pin 23 has a pair of pins 23*a* journalled in its ends, and each of the pins 23*a* has a cupped end 28 to coact with ball-ends 29 of the pins 25 at the other ends of adjacent groups. The cupped ends 28 have lateral openings 30 (see Figure 2) for admitting the ball-ends 29, and when the strip-like member is converted to prismatic form, the cupped ends are turned, as hereinafter described, for preventing the ball-ends from escaping.

Figure 2:
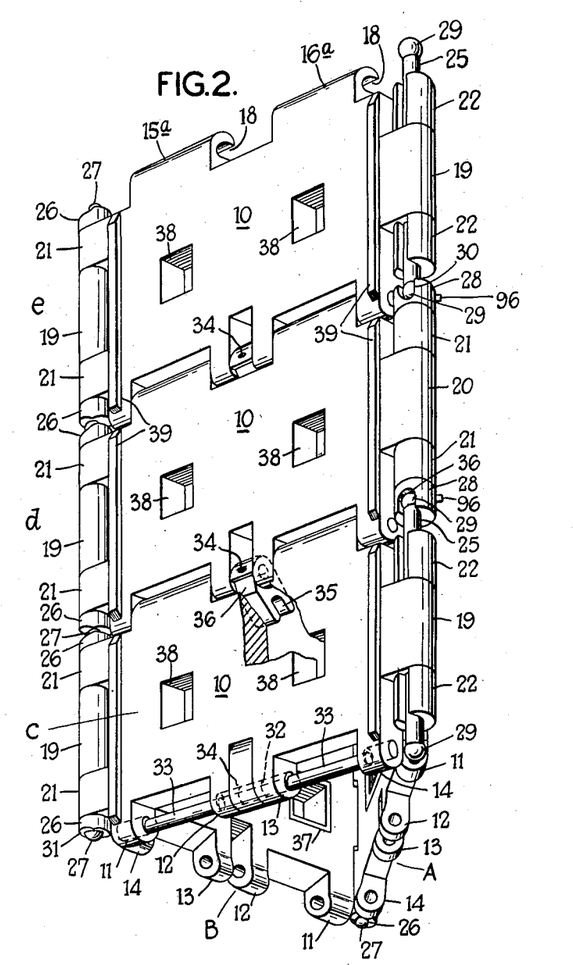
Figure 2 is a perspective view to a larger scale of a portion of the strip-like member after folding to prismatic form.

The terminal cups 26 have their end faces chamfered as indicated at 31 in Figure 2 for enabling the elements of one group to hinge on a transverse axis relatively to the adjacent group so that the strip-like member, when the elements of the groups are in planar form, can be wound on the storage reel; the cupped ends 28, being disengaged from the ball ends 29 in those conditions, do not have to be chamfered in this way.

The corresponding elements of adjacent groups (that is, excepting groups *a* and *b*) are hingedly interconnected by cam pins indicated generally at 32 in Figure 1. One of these is shown more clearly at the foot of Figure 2, from which it can be seen that the pin has coaxial portions, journalled in the hinge barrels 11, 12, 13 and 14, and laterally offset (that is eccentric) portions 33, 33 for engagement over by the lateral openings 18 of the hinge barrels 15*a* and 16*a* of the corresponding element in the group below.

Each cam pin has a central arm 34 fast with it and accommodated within the recess formed between the hinge barrels 12 and 13, and each of these arms has a forked end 35 and a notch 36 to be operated, as hereinafter described, respectively for turning the cam pins out of and into jamming position. The cam pin at the foot of Figure 2 has not yet been turned into its jamming position, but the ones interconnecting groups *c* and *d*, and *d* and *e* have been so turned whereby to turn the eccentric portions 33, 33 for the balls 27 to be gripped tightly between the coacting cups 26 and for the ball-ends 29 to be urged firmly into the cupped ends 28 for taking up any slackness in the interconnections between adjacent groups and investing the prism with rigidity.

The bottom two groups *a* and *b* are each interconnected by a single transverse hinge pin 40 with a central block 41 to locate them axially.

Figures 1 and 2 also show that each element (which can be of a plastic, or a relatively-soft metal) of column B is provided with a laterally-spaced pair of hard metal inserts 37, 37 provided with openings 38 for engagement by a drive means presently described, and that the elements in all three columns are provided with a laterally-spaced pair of raised tracks 39 for a purpose which is also presently described. Openings 38 are left in the elements of columns A and C for lightening purposes.

Figure 3:
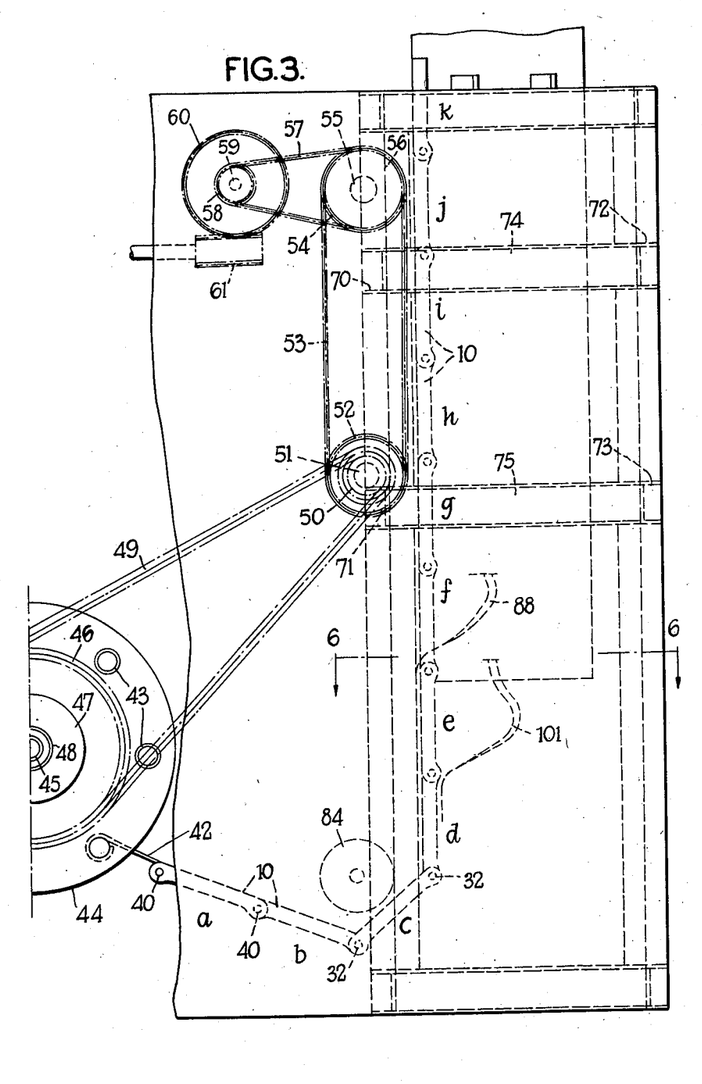
Figure 3 is a side elevation, to the same scale as Figure 1, of a supporting base for the strip-like member and indicates the layout of the means for raising and lowering the latter and converting it from the planar to the prismatic form.

Referring now to Figures 1 and 3, it will be seen that the group *a* of elements is hingedly connected by links 42 with one of a circular series of rods 43 which are fast with end plates 44 (one only of which is shown in each figure) journalled on a shaft 45, thus to form the storage reel on which the strip-like member can be rolled when its groups of elements are in the planar condition. A chain sprocket 46, held between clutch plates 47, 47 rotatively fast with a hub 48 of the end plate shown, is entrained, by a drive-transmission chain 49, with a one-way driving sprocket 50 on a shaft 51 with which a second sprocket 52 is fast. The sprocket 52 is entrained by a chain 53 with a sprocket 54 on a second shaft 55, and this shaft has a second sprocket 56 fast with it and driven by a chain 57 entraining a sprocket 58 on a shaft 59. The latter has a worm wheel 60 receiving drive from a driven worm 61.

Figure 4:
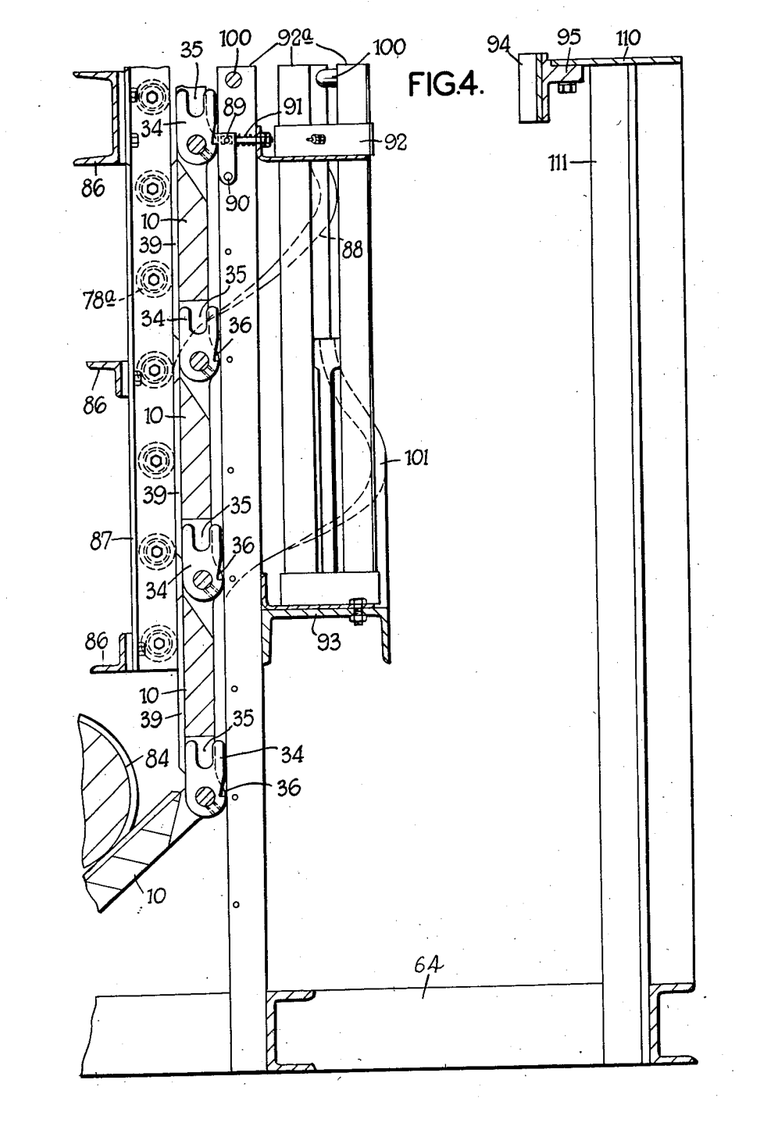
Figure 5:
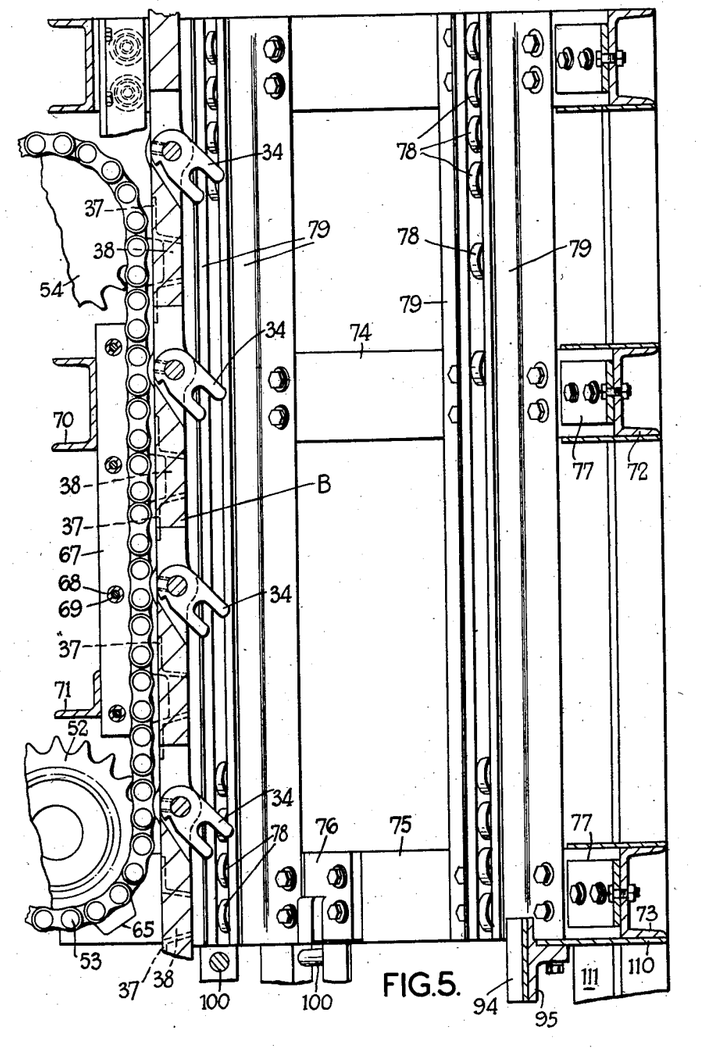
Figure 6:
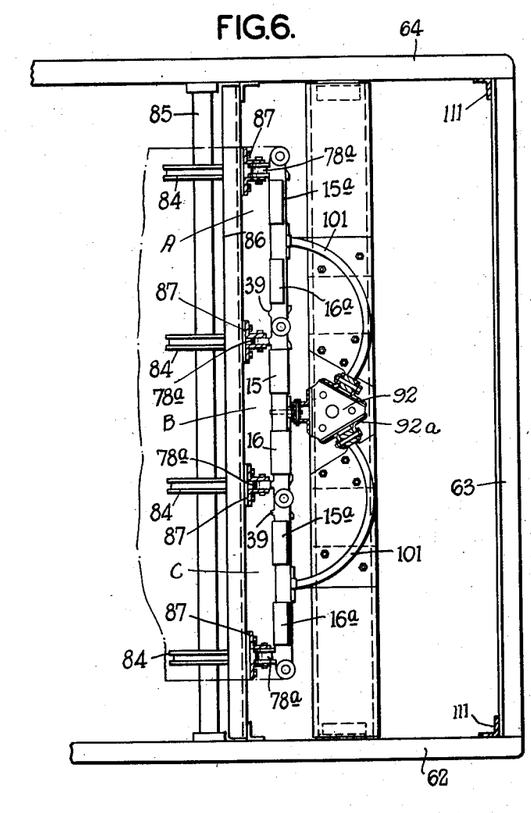
Figure 6 is a section, on the line 6—6 of Figure 3.

The converting means includes a framework which is rectangular in plan, three of four main members at the bottom being shown at 62, 63 and 64 in Figure 6, and there are upright and transverse members to which reference will presently be made with regard to Figures 3 to 7 inclusive.

Figure 7:
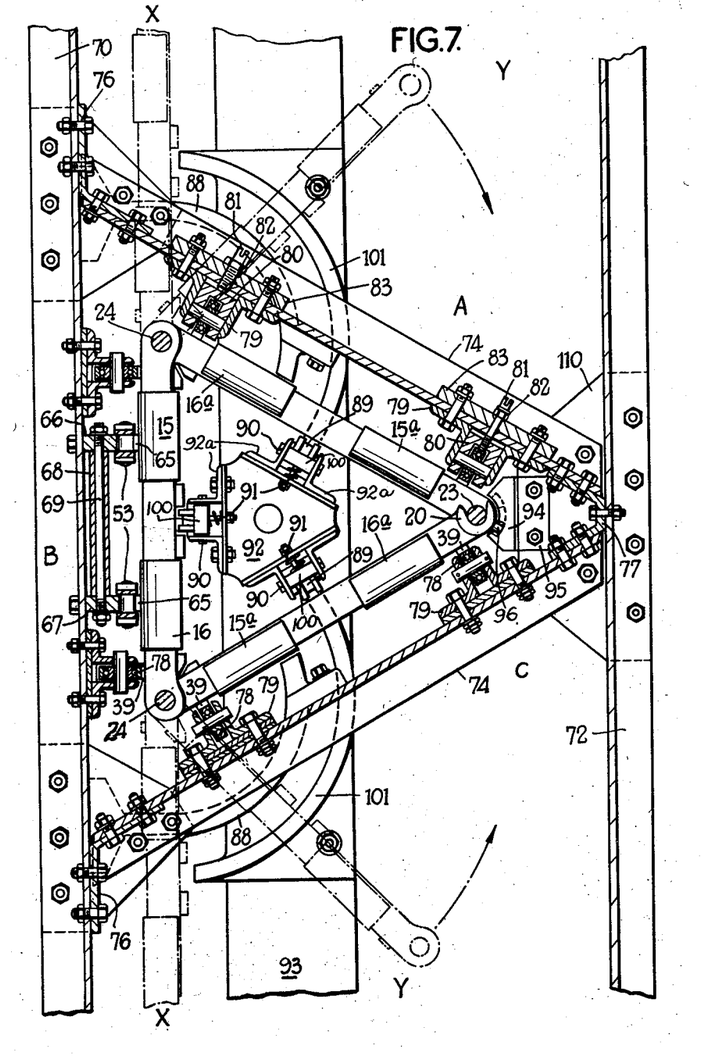
Figure 7 is a horizontal sectional view through the frame member and the strip-like member.

Referring to Figure 5, in which (as also in Figure 4) for clearness the columns A and C have been omitted, it will be seen that the chain 53 has spaced, outward extensions 65 to engage in the holes 38 of the hard metal inserts 37 of the element of column B, the chain in fact being a duplex one as shown in Figure 7 so that both holes of each of the elements are engaged. At the side of the chain which is remote from the extensions 65 is a pair of guide plates 66 and 67, which are spaced by distance sleeves 68 and through-bolts 69, for holding the chain up to the elements 10. The guide plates are supported from transverse frame members 70, 71 which are stayed from parallel frame members 72, 73 by converging frame members 74, 75.

The frame members 74, 75 are connected at one end to the frame members 70, 71 by brackets 76, and they are jointly connected at their other ends to the frame members 72, 73, by angle brackets 77. The strip-like member which, in Figure 7, is shown in prismatic form in full lines (having been moved from the planar condition, shown in chain lines, by means presently described) is guided by rollers 78 which are journalled in brackets 79 fast with the frame members 70 and 75. These rollers engage the raised tracks 39 of the elements 10, and the rollers supported from the frame members 74, 75 are shown journalled in blocks 80 which are acted upon by screws 81, with locknuts 82, for adjustment purposes.

As can best be seen from Figures 5 and 7, the roller brackets 79 are arranged in vertical series interconnecting the frame members 70 and 75.

Referring now to Figures 3, 4 and 6, it will be seen that the chain 53 draws the strip-like member, with each group of elements 10 in planar condition, over a series of guide rollers 84 on a shaft 85 which is suitably journalled from the framework. At a level above the shaft 85 are transverse frame members 86 (see Figures 4 and 6) supporting, in brackets 87, vertical series of rollers 78*a* which coact with the raised tracks 39 of all the elements in a group for maintaining them in planar condition.

As the groups of elements are raised by the chain 53 above this position, those in columns A and C engage under curved guides 88 which swing them, out of plane, from the chain line position X of Figure 7, and through the position Y, to the full line position, whereby to form the strip-like member into prismatic form. During this movement the hinge pins 32 of the elements in columns A and C are withdrawn from the openings 18 in the barrels 15*a*, 16*a* of the lower elements.

As soon as the elements are thus folded and the lateral openings 18 engaged with the hinge pins of the upper elements, respective detents 89, which are pivoted at 90 from a central core 92 and spring-pressed at 91 (see Figures 4 and 7), engage the notches of the arms 34 of all the elements in the group being fed past it, and turns the arms for moving the cam portions 33 towards their jamming positions. Continued upward movement causes the forked ends 35 of each driving arm 34 to engage an abutment 100 (see Figure 4), which completes the turning of the arms into their fully jammed position. Figure 4 shows that the core 92 includes uprights 92*a* which are supported by a transverse frame member 93, also shown in Figure 7.

Continued upward movement of the prism moves it past a cam slot in a member 94 (Figure 7) which is supported from a bracket 95 fast with a gusset 110 connecting an upright 11 to the frame member 73 (Figure 5), and this cam slot acts on an extending pin 96 (see Figures 1, 2 and 7) of the cupper ends 28 to turn the latter into positions in which the coacting ball-ends 29 of the adjacent group are prevented from escaping through the lateral openings 30 of the cupped ends. The portions of the strip-like member above this position are firmly locked in prismatic condition, and as further portions are fed upwardly by the chain 53 the said member is progressively converted from the planar to the prismatic condition.

When it is desired to lower the prism and convert it to planar form, the direction of operation of the chain 53 is reversed and the cam plate 94 acts on the pins 96, in turn, to rotate the cupped ends 28 into the position in which the ball-ends 29 will pass out of the lateral openings 30 when the elements in columns A and C are returned to be planar with those in column B. Next, the forked end 35 of each arm 34, in turn, engages the abutment 100 which, during descent of the associated element, turns the associated arm so as to rotate the cam portions 33 into their unjamming positions, whereafter the undersides of the elements in columns A and C encounter a second curved guide 101 for moving them into the same plane as the elements in column B, the hinge pins 32 of the elements in columns A and C again re-engaging in the openings 18 of the group beneath. The now planar groups are then wound on the storage reel, which at this time is being driven through the one-way driving sprocket 50.

It will be seen that, by the invention, all of the elements will be bound firmly together by the cam action of the transverse hinge pins so as to provide a rigid mast, boom, etc., and that, during conversion from the rigid to the flexible condition, and vice versa, the transverse hinge pins are automatically moved, as appropriate, between their jamming and nonjamming positions.

What I claim is:

1. A strip-like member of the kind which is reversibly convertible, progressively from one end to the other, from a flat, flexible condition to a prismatic, rigid condition, comprising an assembly of generally-rectangular elements arranged in parallel groups, each group extending transversely of the strip-like member and including at least three elements which are interconnected at their adjacent longitudinal edges by hinge pins having their axes directed longitudinally of the strip, and the corresponding elements of adjacent groups being interconnected at their adjacent transverse edges by hinge pins having their axes directed transversely of the strip, when the member is in the flat or the prismatic condition but in such a manner that at least the flanking elements of adjacent groups can be freed from each other to permit relative hinging about the coacting longitudinal hinge pins for enabling the said flanking elements to move from the flat to the prismatic condition and vice versa, each of said transverse hinge pins having laterally offset portions which, when the hinge pin is appropriately turned with the two elements coplanar, act cam-wise for urging parts of longitudinally adjacent elements into firm abutting relationship.

2. A strip-like member according to claim 1, in which corresponding elements of adjacent groups are formed with staggered, hinge barrels, the coaxial portions of the coacting hinge pins engaging in the hinge barrels of one of the elements and the laterally offset portions of the hinge pin engaging in the hinge barrels of the other element.

3. A strip-like member according to claim 1, in which the parts of said longitudinally adjacent elements which are urged into abutting relationship are constituted by the longitudinal hinge pins of said elements, the ends of these hinge pins abutting through ball-type joints which seize when the transverse hinge pins are turned.

4. A strip-like member according to claim 1, in which the laterally-outer edge of one flanking element of each group is provided with an anchor means and the laterally-outer edges of the opposite flanking element of the group is formed with hook means, said anchor means and said hook means coacting to form an interlock when the said flanking elements are folded about their longitudinal hinge pins to form the prismatic cross-section.

5. A strip-like member according to claim 4, in which the anchor means are axial portions of longitudinally directed pins which are held fast in barrels of the one flanking elements.

6. A strip-like member according to claim 1, in which the laterally-outer edge of one flanking element of each group is formed with a barrel, a longitudinally extending pin fast with the barrel, the extremities of the longitudinally directed pins of the corresponding one flanking elements of alternate groups being ball-ended and coacting with cupped ends of the corresponding longitudinally directed pins of intermediate groups, the cupped ends being rotatably supported from their pins and having means to be acted upon, by a means for reversibly converting the member from the flexible to the rigid condition, for turning the cupped ends from a position in which a lateral opening, of the cupped ends, will admit the coacting ball-ends to a position in which the lateral opening is moved out of the path of the ball-ends for the latter to be confined within the cupped ends.

7. A strip-like member according to claim 1, in which each said transverse hinge pin of the elements has fast with it a laterally-extending arm, for coaction with a means for reversibly converting the member from the flexible to the rigid condition.

8. A strip-like member which is convertible from a flat flexible condition to a rigid prismatic condition comprising an assembly of rectangular elements arranged in parallel groups of three elements, each group extending transversely of the strip-like member, hinge pins interconnecting the longitudinally adjacent edges of the elements of each group, locking means on the laterally outer edges of the outer elements of a group for interconnecting said outer edges when the group is in prismatic condition, and hinge pins interconnecting transversely adjacent edges of corresponding elements of adjacent groups, said last-mentioned hinge pins including portions in engagement with one of said corresponding elements and laterally offset portions in engagement with the other of said corresponding elements whereby when said hinge pin is turned it operates cam-wise to urge the said elements towards and into engagement with one another.

9. The combination of a strip-like member which is convertible from a flat flexible condition to a rigid prismatic condition comprising an assembly of rectangular elements arranged in parallel groups of three elements, each group extending transversely of the strip-like member, hinge pins interconnecting the longitudinally adjacent edges of the elements of each group, locking means on the laterally outer edges of the outer elements of a group for interconnecting said outer edges when the group is in prismatic condition, and hinge pins interconnecting transversely adjacent edges of corresponding elements of adjacent groups, said last-mentioned hinge pins including portions in engagement with one of said corresponding elements and laterally offset portions in engagement with the other of said corresponding elements whereby when said hinge pin is turned it operates camwise with means for reversibly converting the strip-like member from the flexible to the rigid condition, said means including a former, of the appropriate prismatic cross-section, means for feeding the member in the longitudinal direction and relative to said former, and guides for progressively folding the end elements of the groups about their longitudinal hinge pins in the appropriate direction as the member is fed relatively to the former.

10. The combination according to claim 9, in which the converting means includes abutments which coact with surfaces of laterally-extending arms of the transverse hinge pins whereby to turn the latter into the element engaging or dis-engaging position dependently on whether the member is being fed, relatively to the former, for conversion to the rigid or to the flexible form.

11. The combination according to claim 9, in which the converting means includes cam means to act on the said locking means at the laterally-outer edges of the outer elements of each group whereby reversibly to lock or to unlock the two said laterally-outer edges dependently on whether the member is being fed, relatively to the converting means, for conversion from the flexible to the rigid form, or vice versa.

12. A strip-like member reversibly convertible from a flat, flexible condition to a prismatic, rigid condition comprising a plurality of elements arranged in transversely extending groups with the corresponding elements of each group in substantially longitudinal alignment, means interconnecting the longitudinal adjacent edges of the elements of each group, means for interconnecting the outer elements of a group along their outer edges, and means interconnecting transversely adjacent parts of corresponding elements of adjacent groups having portions engaging one of said corresponding elements and cam portions engaging the other of said corresponding elements whereby when said transversely interconnecting means is moved it operates cam-wise to urge said corresponding elements into rigid engagement with one another.

References Cited in the file of this patent

UNITED STATES PATENTS 2,143,953     Le Roy  ---------------- Jan. 17, 1939